United States Patent
Acker et al.

(10) Patent No.: US 9,184,652 B2
(45) Date of Patent: Nov. 10, 2015

(54) METHOD AND APPARATUS FOR INVERTER OUTPUT CURRENT HARMONIC REDUCTION

(71) Applicant: Enphase Energy, Inc., Petaluma, CA (US)

(72) Inventors: Brian Acker, Sebastopol, CA (US); Andrew Barnes, Santa Rosa, CA (US)

(73) Assignee: Enphase Energy, Inc., Petaluma, CA (US)

( * ) Notice: Subject to any disclaimer, the term of this patent is extended or adjusted under 35 U.S.C. 154(b) by 100 days.

(21) Appl. No.: 14/011,220

(22) Filed: Aug. 27, 2013

(65) Prior Publication Data

US 2014/0063873 A1 Mar. 6, 2014

Related U.S. Application Data (60) Provisional application No. 61/694,022, filed on Aug. 28, 2012.

(51) Int. Cl.
| | |
|---|---|
| *H02M 1/12* | (2006.01) |
| *H02M 7/04* | (2006.01) |
| *H02M 1/00* | (2007.01) |
| *H02J 3/38* | (2006.01) |

(52) U.S. Cl.
CPC ........ *H02M 1/12* (2013.01); *H02M 7/04* (2013.01); *H02J 3/383* (2013.01); *H02M 2001/0009* (2013.01); *Y02E 10/563* (2013.01)

(58) Field of Classification Search
CPC ............ H02J 3/383; H02J 3/01; H02M 1/12; H02M 1/44; H02M 7/525; Y02E 40/40
USPC ............. 702/106; 360/25, 27, 75; 363/50, 55, 363/39, 40, 41, 42
See application file for complete search history.

(56) References Cited

U.S. PATENT DOCUMENTS

| | | | | |
|---|---|---|---|---|
| 4,153,930 | A | * 5/1979 | Marceau et al. | 363/42 |
| 4,245,290 | A | * 1/1981 | Lipman | 363/41 |
| 5,168,437 | A | * 12/1992 | Gyugyi et al. | 363/42 |
| 5,212,629 | A | * 5/1993 | Jessee | 363/42 |

(Continued)

FOREIGN PATENT DOCUMENTS

| | | |
|---|---|---|
| EP | 0 390 184 A2 | 10/1990 |
| EP | 1 568 192 B1 | 8/2005 |

OTHER PUBLICATIONS

Author: Rukonuzzaman. M and M. Nakaoka Date: 2001 Title: Single-phase shunt active power filter with adaptive neural network method for determining compensating current Publisher: IECON01: The 27th Annual Conference fo the IEEE industrial Electronics Society pp. 2032-2037.*

"1547-2003—IEEE Standard for Interconnecting Distributed Resources With Electric Power Systems", downloaded from: http://wenku.baidu.com/view/a3666cf14693daef5ef73deb.htm on Jan. 15, 2014, 1 pg.

M.A.A. Younis et al., "Harmonic Reduction In Three-Phase Parallel Connected Inverter", World Academy of Science, Engineering and Technology 50, 2009, pp. 944-949.

Deib Ali Deib, "Programmed harmonic reduction in inverters and controlled rectifiers", downloaded from: http://etd.ohiolink.edu/send-pdf.cgi/Deib%20Deib%20Ali.pdf?ohiou1173759592, on Jan. 16, 2014, 1 pg.

(Continued)

*Primary Examiner* — Gary L Laxton
(74) *Attorney, Agent, or Firm* — Moser Taboada (57) ABSTRACT

Method and apparatus for reducing harmonic distortion. In one embodiment, the method comprises determining an inverter output current waveform; determining a plurality of harmonic components of the inverter output current waveform; determining, based on the plurality of harmonic components, a plurality of harmonic compensation components; and generating a compensating current comprising the plurality of harmonic compensation components.

20 Claims, 5 Drawing Sheets

(56) References Cited

U.S. PATENT DOCUMENTS

| | | | |
|---|---|---|---|
| 5,473,460 A * | 12/1995 | Haner et al. | 398/194 |
| 5,835,364 A | 11/1998 | DeWinter et al. | |
| 5,889,668 A | 3/1999 | Schauder et al. | |
| 5,930,067 A * | 7/1999 | Andrews et al. | 360/77.04 |
| 5,933,339 A | 8/1999 | Duba et al. | |
| 7,577,007 B2 | 8/2009 | Mori et al. | |
| 7,847,507 B2 * | 12/2010 | Wagoner | 318/599 |
| 8,064,851 B2 | 11/2011 | McCallister | |
| 8,069,000 B2 * | 11/2011 | Kim et al. | 702/63 |
| 8,081,928 B2 * | 12/2011 | Kelly | 455/63.1 |
| 8,280,667 B2 * | 10/2012 | Miyasaka | 702/106 |
| 8,294,516 B2 | 10/2012 | Young et al. | |
| 2010/0290258 A1 | 11/2010 | Sullivan | |
| 2010/0290261 A1 * | 11/2010 | Sullivan | 363/131 |
| 2011/0266992 A1 | 11/2011 | Nishiguchi et al. | |

OTHER PUBLICATIONS

Stan McClellan et al., "Coherent Pre-Distortion of Low-Frequency PLC Carriers", downloaded from: http://www.google.com.in/url?sa=t&rct=j&g=&esrc=s&source=web&cd=1&cad=rja&ved=0CCwQFiAA&url=http%3A%2F%2Fwww.thinkmind.org%2Fdownload.php%3Farticleid%3Dctrg_2013_2_10_10022& ei=hZgLUcnVEM7jrAeY7oH4Ag& usg=AFQiCNFEZ8vhdYRZ-WRM3DMbr-SYKfxTA&bwm=bv.46340616.d. on Jan. 16, 2014, 6 pgs.

* cited by examiner

METHOD AND APPARATUS FOR INVERTER OUTPUT CURRENT HARMONIC REDUCTION

CROSS-REFERENCE TO RELATED APPLICATIONS

This application claims benefit of U.S. provisional patent application Ser. No. 61/694,022, filed Aug. 28, 2012, which is herein incorporated in its entirety by reference.

BACKGROUND OF THE INVENTION

1. Field of the Invention

Embodiments of the present disclosure relate generally to power conversion and, in particular, to reducing harmonics in output current from a power conversion module.

2. Description of the Related Art

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generator (DG) system can then be sold to the commercial power company.

During the power conversion process, non-ideal circuit behavior may result in undesirable harmonics in the generated output current. Further, inverter output current coupled to a commercial power grid must comply with restrictions regarding harmonics as specified in relevant regulatory requirements, such as IEEE-1547-2003. One technique for reducing inverter output current harmonic distortion is to use passive filtering. Due to the relatively low frequencies of some harmonic components, the components required for the passive filters would be bulky and expensive, leading to an undesirable increase in size and cost of the inverter.

Therefore, there is a need for a method and apparatus for efficiently reducing distortion in output current from a power conversion module.

SUMMARY OF THE INVENTION

Embodiments of the present invention generally relate to a method and apparatus for reducing harmonic distortion substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
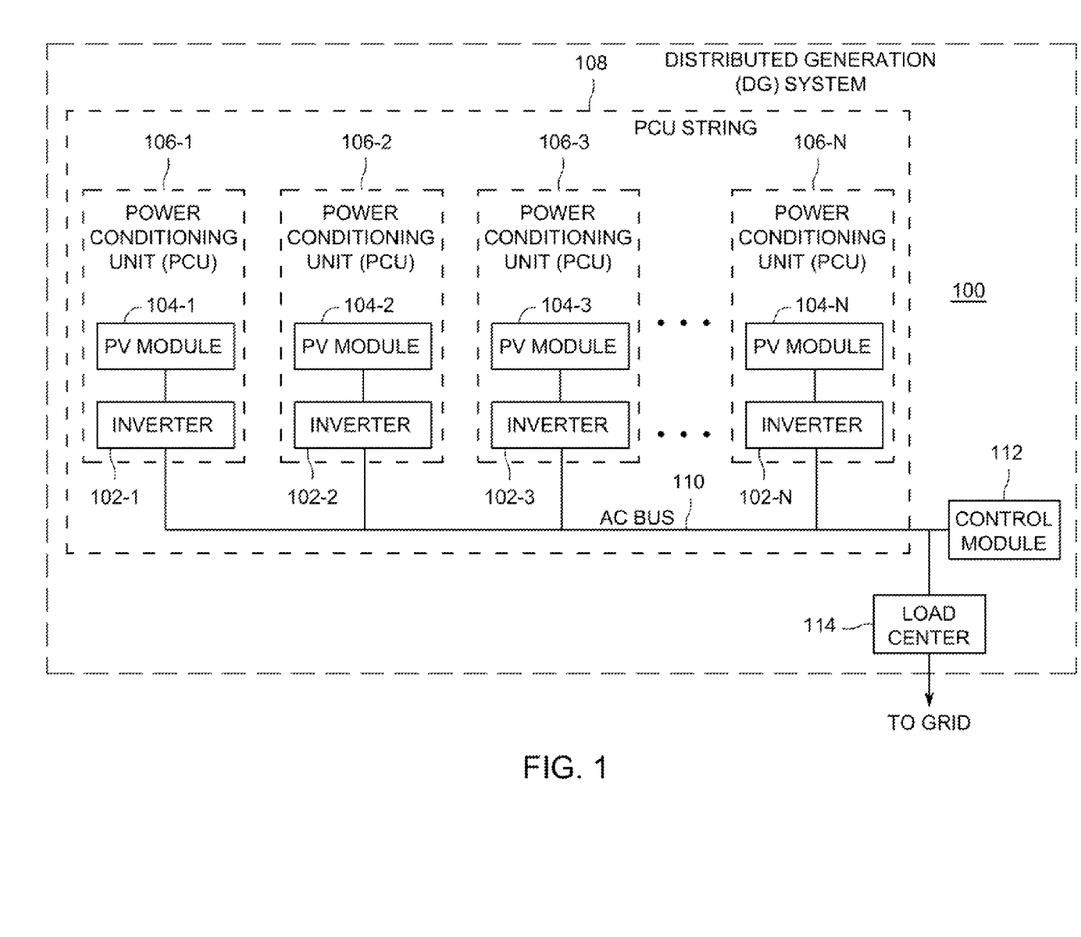
FIG. 1 is a block diagram of a distributed generator (DG) system in accordance with one or more embodiments of the present invention.

FIG. 1 is a block diagram of a distributed generator (DG) system 100 in accordance with one or more embodiments of the present invention. This diagram only portrays one variation of the myriad of possible system configurations. The present invention can function in a variety of distributed power generation environments and systems.

The DG system 100 ("system 100") comprises a plurality of inverters 102-1, 102-2 ... 102-n, collectively referred to as inverters 102 (or power conversion modules 102), a plurality of PV modules 104-1, 104-2 ... 104-n, collectively referred to as PV modules 104, an AC bus 110, and a load center 114. Each inverter 102-1, 102-2, 102-3, ... 102-n is coupled to a PV module 104-1, 104-2, 104-3, ... 104-n, respectively, in a one-to-one correspondence. In some embodiments, a DC-DC converter may be coupled between each PV module 104 and each inverter 102 (e.g., one DC-DC converter per PV module 104). Alternatively, multiple PV modules 104 may be coupled to a single inverter 102 (i.e., a centralized inverter); in some such embodiments, a DC-DC converter may be coupled between the PV modules 104 and the centralized inverter.

The inverters 102 are coupled to the AC bus 110, which in turn is coupled to the load center 114. The load center 114 houses connections between incoming power lines from a commercial power grid distribution system and the AC bus 110. Each PV module/inverter pair forms a power conditioning unit (PCU) 106 for generating AC power; e.g., PCU 106-1 comprises PV module 104-1 and inverter 102-1. For each PCU 106, the corresponding inverter 102 converts DC power from the coupled PV module 104 into AC power and meters out AC current that is in phase with the AC commercial power grid voltage.

The PCUs 106 form a string 108 and couple the generated AC power to the commercial power grid via the load center 114. Additionally or alternatively, the generated power may be coupled to appliances, and/or energy generated may be stored for later use; for example, the generated energy may be stored utilizing batteries, heated water, hydro pumping, H2O-to-hydrogen conversion, or the like. In some embodiments, one or more additional strings 108 may be present in the system 100 and/or the system 100 may comprise other types of renewable energy generators in addition to or in place of the PV modules 104, such as wind turbines, hydroelectric systems, or the like.

The system 100 further comprises a control module 112 coupled to the AC bus 110. The control module 112 is capable of issuing command and control signals to the inverters 102 in order to control the functionality of the inverters 102, receiving data transmitted by the inverters 102, and/or monitoring one or more parameters of the inverters 102.

In accordance with one or more embodiments of the present invention, the inverters 102 each employ an active harmonic reduction technique to compensate for predictable output current aberrations by pre-distorting the commanded inverter output current waveform with pre-determined harmonic components. Such pre-determined harmonic components are injected into the AC line, thereby reducing or eliminating the undesired harmonics. For example, the undesired harmonics may be reduced to a level below a threshold required by relevant regulatory standards.

In order to determine and control the harmonic content of the generated output current, a predictive technique is employed in some embodiments using a priori knowledge of the distortion caused by the inverter's power conversion module topology (e.g., notching of the output current waveform near the zero-crossings) to predict harmonic compensation components—i.e., compensating distortion components to counteract the generated harmonics. The inverter 102 may then be pre-loaded with the determined harmonic compensation components (i.e., the inverter 102 is pre-loaded with a distorted sine wave, such as a full or half-sine wave, which contains the determined harmonic compensation components), or the harmonic compensation components (i.e., the distorted sine wave) may be communicated to the inverter 102 (e.g., by the control module 112), and the inverter 102 may then generate the desired harmonic compensation without requiring feedback of either inverter output current or output voltage.

In other embodiments, inverter output current may be monitored and used to determine the harmonic compensation components. For example, each inverter 102 may measure its output current and determine corresponding harmonic compensation components, which may then be periodically updated (e.g., upon activation of the inverter 102 each morning). Alternatively, the control module 112 may determine harmonic compensation components (e.g., the control monitor 112 may measure the current from the inverters 102 and use such information to determine the harmonic compensation components) and communicate the determined components to the inverters 102, for example upon initial activation of the inverters 102 each morning.

Figure 2:
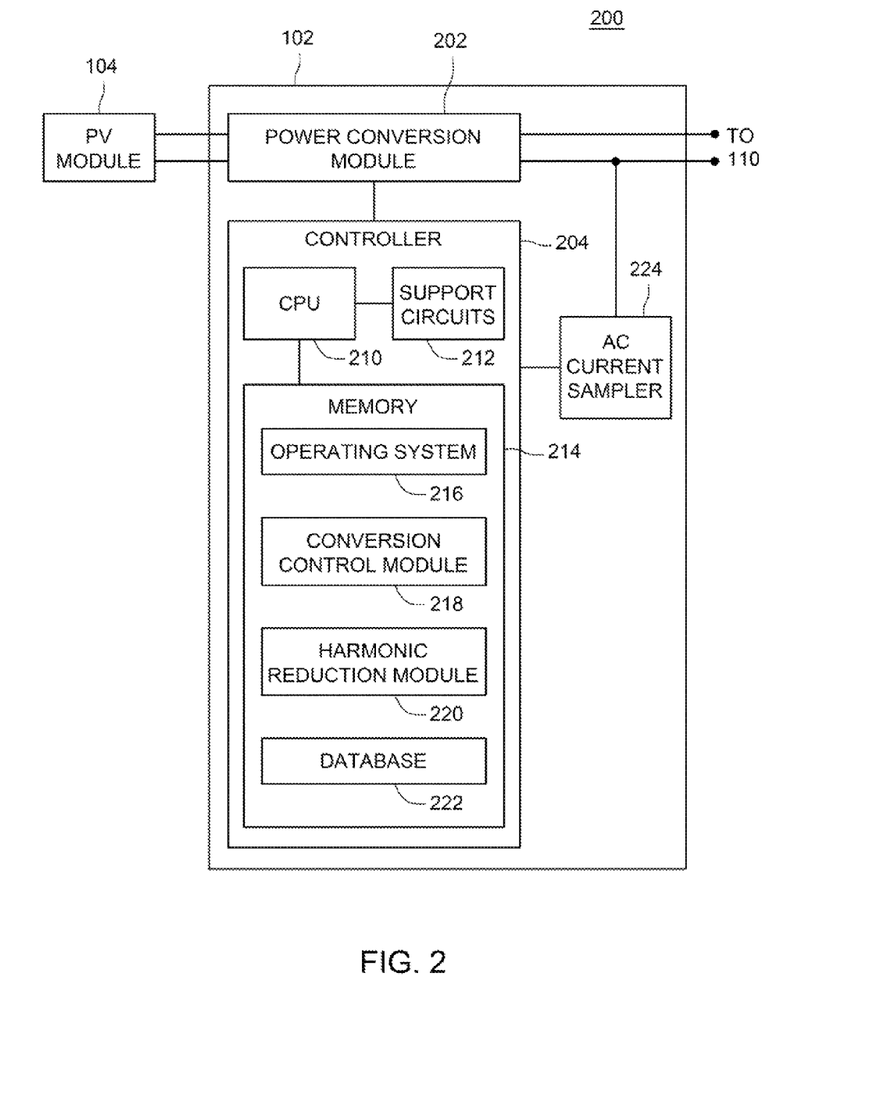
FIG. 2 is a block diagram of an inverter in accordance with one or more embodiments of the present invention.

FIG. 2 is a block diagram of an inverter 102 in accordance with one or more embodiments of the present invention. The inverter 102 comprises a power conversion module 202, an AC current sampler 224, and a controller 204.

The power conversion module 202 is coupled to the PV module 104 and the controller 204 and converts DC current from the PV module 104 to AC output current as controlled by the controller 204. The AC current sampler 224 is coupled to an output terminal of the power conversion module 202, as well as the controller 204. The AC current sampler 224 samples the AC current at the output of the power conversion module 202, for example at a rate of 30.72 kHz, and provides the sampled AC current and values to the controller 204. The input signals to the AC current sampler 224 may be filtered, for example via traditional analog filter techniques, digital signal processing, or similar techniques, and an analog-to-digital (A/D) conversion is performed utilizing standard ND technology. The resulting instantaneous values, or samples, of AC current are coupled to the controller 204 and may be used for the DC to AC conversion and/or for harmonic reduction.

The controller 204 may be comprised of hardware, software, or a combination thereof, and comprises at least one central processing unit (CPU) 210 coupled to support circuits 212 and memory 214. The CPU 210 may comprise one or more conventionally available microprocessors, microcontrollers, processors, combinations thereof and the like, which are configured to execute non-transient software instructions to perform various tasks in accordance with the present invention and are capable of performing the processing described herein. In some embodiments, the CPU 210 may be a microcontroller comprising internal memory for storing controller firmware that, when executed, provides at least a portion of the functionality described below with respect to FIG. 3. Alternatively, the CPU 210 may include one or more application specific integrated circuits (ASICs).

The support circuits 212 are well known circuits used to promote functionality of the CPU 210. Such circuits include, but are not limited to, a cache, power supplies, clock circuits, buses, network cards, input/output (I/O) circuits, and the like. The controller 204 may be implemented using a general purpose computer that, when executing particular software, becomes a specific purpose computer for performing various embodiments of the present invention.

The memory 214 may comprise random access memory, read only memory, removable disk memory, flash memory, and various combinations of these types of memory. The memory 214 is sometimes referred to as main memory and may, in part, be used as cache memory or buffer memory. The memory 214 generally stores the operating system (OS) 216 of the controller 204. The OS 216 may be one of a number of commercially available such as, but not limited to, Linux, Real-Time Operating System (RTOS), and the like. The memory 214 stores non-transient processor-executable instructions and/or data that may be executed by and/or used by the CPU 210. These processor-executable instructions may comprise firmware, software, and the like, or some combination thereof.

The memory 214 may store various forms of application software, such as a conversion control module 218 for providing operative control of the power conversion module 202 and driving the power conversion module 202 to generate a commanded AC current waveform and to inject the generated AC current in phase with the grid as required by the relevant standards.

The memory 214 further stores a harmonic reduction module 220 for pre-distorting the commanded output current waveform with pre-determined harmonic compensation components to compensate for undesirable harmonics in the generated output current, for example undesirable harmonics caused by non-ideal circuit behavior of the power conversion module 202. The harmonic compensation components are injected onto the AC line with respect to the existing harmonic components. In some embodiments, the harmonic reduction module 220 may comprise a look-up table storing pre-determined harmonic compensation components (i.e., a pre-distorted full or half-sine wave), as described further below with respect to FIG. 3. In one or more embodiments, the harmonic reduction module 220 may determine harmonic components of the inverter output current waveform (e.g., the amplitudes of the harmonic components may be analytically calculated based on the inverter output current waveform) and/or determine the corresponding harmonic compensation components.

The memory 214 further stores a database 222 for storing data, such as data related to operating the power conversion module 202 as well as data for use in reducing undesired harmonics in accordance with the present invention.

Figure 3:
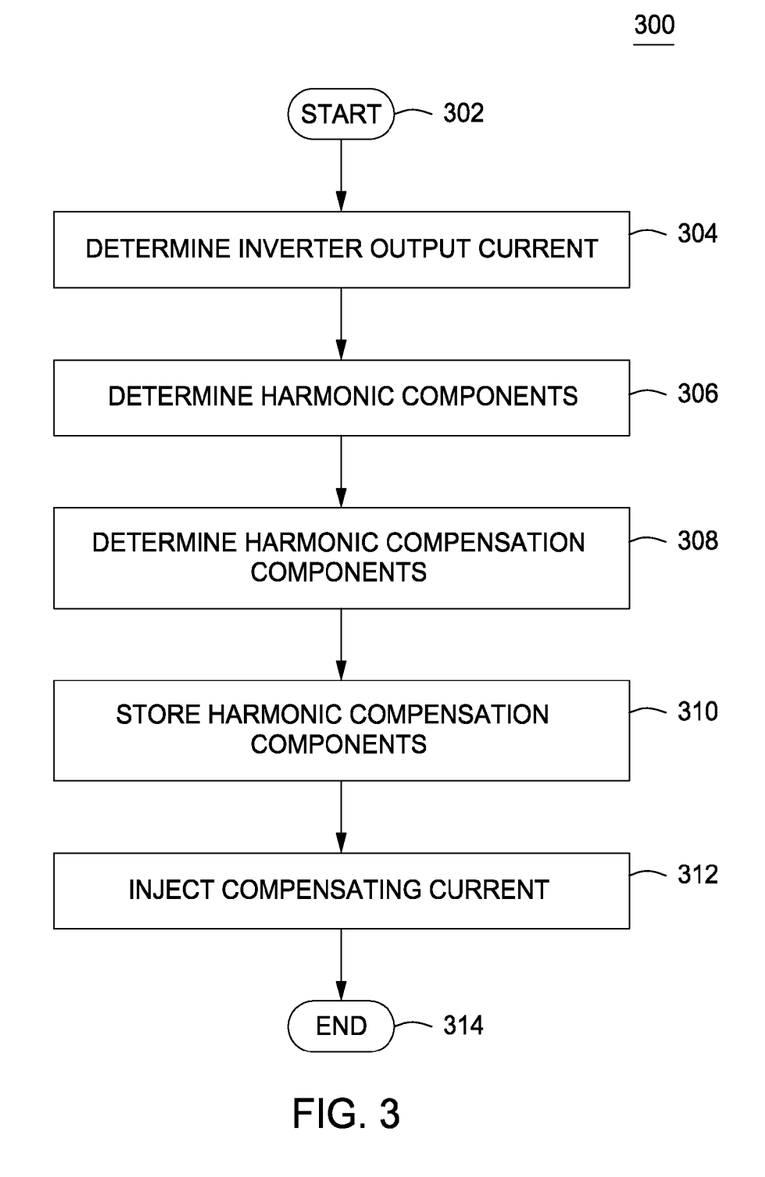
FIG. 3 is a flow diagram of a method for generating harmonic compensation in output current from a power conversion module in accordance with one or more embodiments of the present invention.

FIG. 3 is a flow diagram of a method 300 for generating harmonic compensation in output current from a power conversion module in accordance with one or more embodiments of the present invention.

In some embodiments, such as the embodiment described below, a power conditioning unit (PCU) comprises a photovoltaic module (PV module) coupled to an inverter for converting DC input from the PV module to AC current (e.g., the PCU 106 comprising the PV module 104 and the inverter 102). The PCU is coupled along with one or more other PCUs to a commercial AC power grid via an AC bus, and the AC current generated by the PCU is coupled to the grid (e.g., the string 108 of the system 100). In some other embodiments, one or more PV modules may be coupled to a single inverter (i.e., a centralized inverter). In some alternative embodiments, other types of renewable energy generators may be utilized in addition to or in place of the PV modules, such as wind turbines, hydroelectric systems, or the like.

Although the method 300 is described below with respect to a single inverter, the method 300 may be applied with respect to each inverter within the string.

The method 300 starts at step 302 and proceeds to step 304. At step 304, an inverter output current waveform is determined. In some embodiments, the current waveform may be analytically modeled, for example based on knowledge of actual output current from one or more inverters. In other embodiments, the current waveform may be empirically determined by measuring the output current from one or more inverters. For example, current samples from the AC current sampler 224 may be used in determining the output current from the inverter 102, a controller coupled to one or more inverters (such as controller 112) may measure inverter output current, or a separate current monitor may be coupled at the output of one or more inverters for measuring the output current.

The method 300 proceeds to step 306, where a plurality of harmonic components of the current waveform are determined. In some embodiments, the amplitude of each of the harmonic components is calculated analytically based on the current waveform determined in step 304; in other embodiments, the amplitude of each of the harmonic components is measured using a spectrum analyzer and inverter hardware. Generally, a range of harmonic components are determined from the $23^{rd}$ to the $39^{th}$ harmonic (inclusive), although other ranges of harmonics and/or specific harmonics may be determined.

The method 300 proceeds to step 308. At step 308, harmonic compensation components are determined with respect to each of the harmonics determined in step 306. In some embodiments, amplitude and phase of each harmonic compensation component many be tuned (e.g., hand-tuned) such that the corresponding harmonics are eliminated or reduced to a suitable level. In other embodiments, the harmonic compensation components may be determined analytically, manually, or automatically via an optimization algorithm (e.g., either separately or within the inverter).

The method 300 proceeds to step 310. At step 310, the harmonic compensation components are stored for use within one or more inverters. As previously described, the harmonic compensation components may be pre-loaded into an inverter (i.e., the inverter is pre-loaded with a distorted sine wave which contains the determined harmonic compensation components) or, alternatively, may be periodically computed (either within the inverter or external to the inverter) and updated in the inverter. The harmonic compensation components may be stored in a look-up table format (i.e., a look-up table for a full or half-sine wave containing all the compensation harmonics); in some embodiments, the harmonic reduction module 220 may be a look-up table comprising the harmonic compensation components in a hardware implementation that runs continuously while the power conversion module 202 is performing power conversion. The method 300 proceeds to step 312. During operation of the inverter 102, the harmonic compensation components are obtained from storage and used to inject a compensating current (i.e., the compensating current is superimposed on the current waveform generated at the fundamental frequency) that reduces or eliminates the undesired harmonics.

The method 300 proceeds to step 314 where it ends.

Figure 4A:
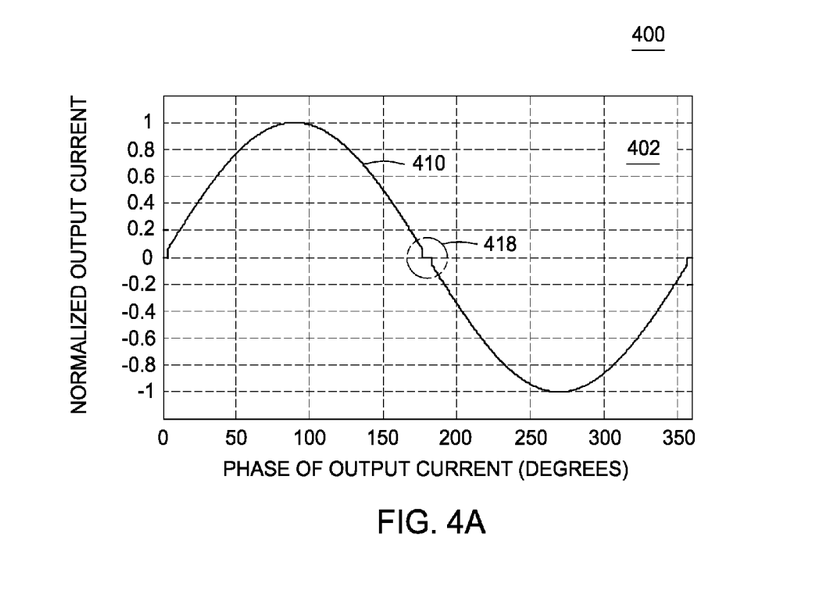
FIGS. 4a-4d comprise a plurality of graphs depicting harmonic compensation generated in accordance with one or more embodiments of the present invention.

FIGS. 4a-4d comprise a plurality of graphs 400 depicting harmonic compensation generated in accordance with one or more embodiments of the present invention. FIG. 4a is a first graph 402 that depicts a single cycle (i.e., from 0°-360° phase along an x-axis) of a normalized inverter output current waveform 410 having a peak positive amplitude of "1", a peak negative amplitude of "−1", and a zero-cross notching 418 (i.e., zero-crossing distortion) proximate the zero-crossing. The inverter output current waveform 410 may be determined as previously described with respect to the method 300.

Figure 4B:
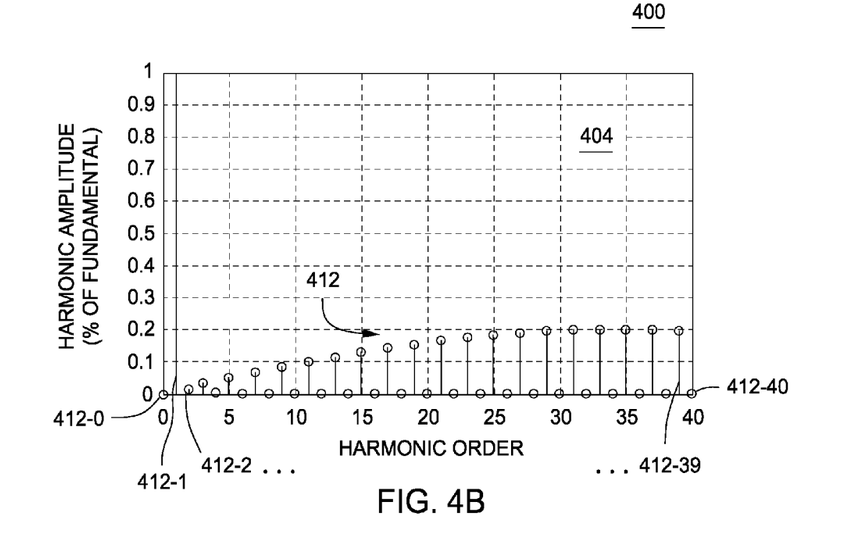

FIG. 4b is a second graph 404 that depicts the amplitude for a plurality of harmonic components 412-0, 412-1, . . . 412-40, collectively referred to as harmonic components 412. The harmonic components 412-0 through 412-40 are depicted sequentially along an x-axis of the graph 404 and are determined from the inverter output current waveform 410, for example as previously described with respect to the method 300. For each of the harmonic components 412, the corresponding amplitude is depicted along a y-axis of the graph 404 as a percentage of the amplitude of the fundamental frequency waveform.

Figure 4C:
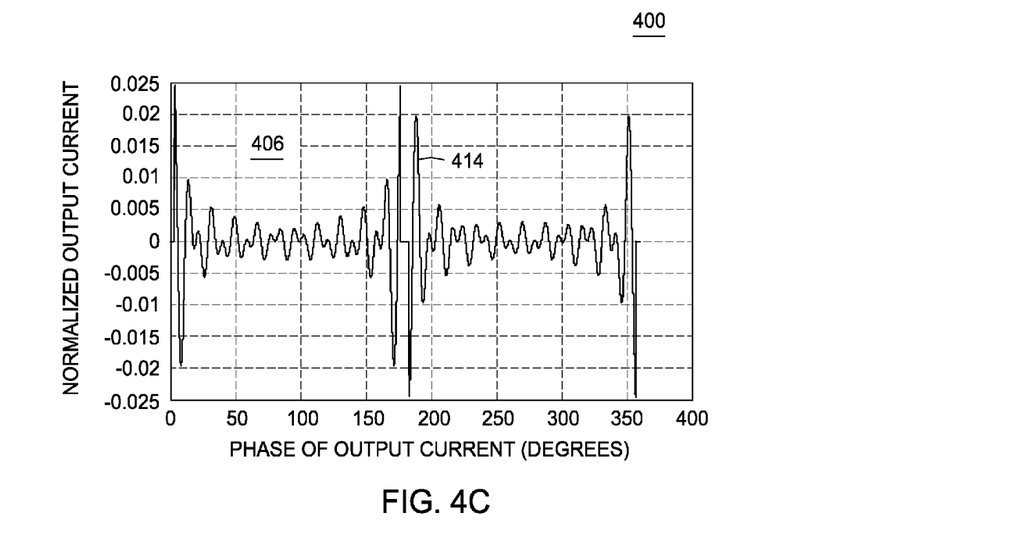

FIG. 4c is a third graph 406 depicts a normalized injected compensation current 414 over a 0°-360° phase range along an x-axis. The injected compensation current 414 is generated based on harmonic compensation components determined to reduce or eliminate one or more of the harmonic components 412, for example the harmonic components from the $23^{rd}$ order to the $39^{th}$ order (inclusive), and is depicted with the fundamental removed. Such harmonic compensation components are determined and stored as previously described with respect to the method 300.

Figure 4D:
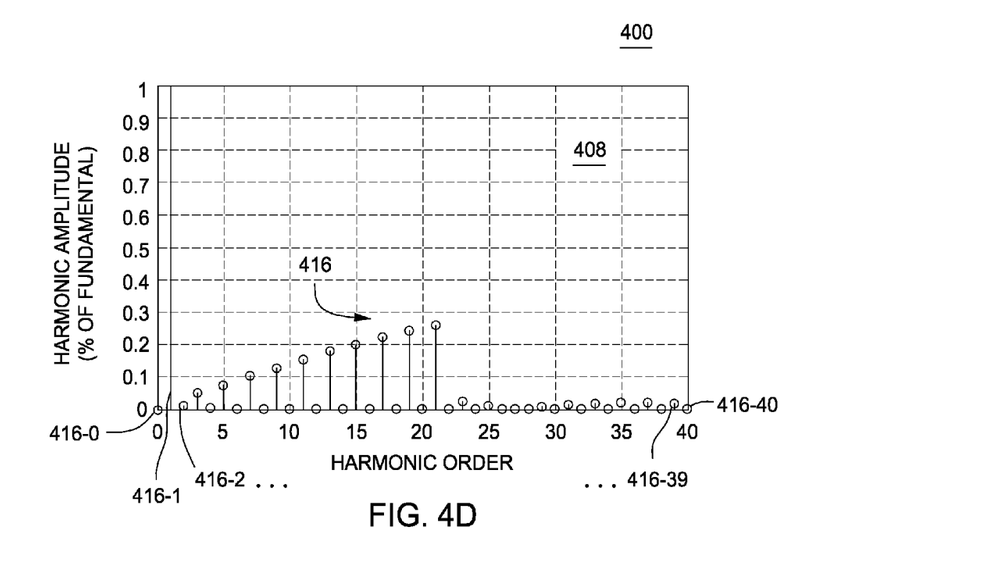

FIG. 4d is a fourth graph 408 depicts the amplitude for a plurality of harmonic components 416-0, 416-1, . . . 416-40, collectively referred to as harmonic components 416, following harmonic compensation (i.e., following injection of the compensation current 414). The harmonic components 416-0 through 416-40 are depicted sequentially along an x-axis of the graph 408 with the corresponding amplitude depicted along the y-axis of the graph 408 as a percentage of the amplitude of the fundamental frequency waveform. As shown in the graph 408, harmonic components from the $23^{rd}$ order to the $39^{th}$ order (inclusive) have an amplitude of or near zero and are thereby eliminated or reduced to a suitable level.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A method for reducing harmonic distortion, comprising:
   determining an inverter output current waveform characterized by notching proximate respective zero crossings, wherein each notch corresponds to distortion associated with operation of an inverter;

determining a plurality of harmonic components of the inverter output current waveform, at least some harmonic components of the plurality of harmonic components resulting from the distortion;

determining, based on the plurality of harmonic components, a plurality of harmonic compensation components; and generating, by an inverter coupled to a distributed generator having at least one energy generator module, a compensating current comprising the plurality of harmonic compensation components.

2. The method of claim 1, wherein the inverter output current waveform is determined by analytical modeling based on an output current from one or more inverters.

3. The method of claim 1, wherein the inverter output current waveform is empirically determined by measuring an output current from one or more inverters.

4. The method of claim 1, wherein an amplitude of each harmonic component of the plurality of harmonic components is analytically calculated based on the inverter output current waveform.

5. The method of claim 1, wherein an amplitude of each harmonic component of the plurality of harmonic components is measured for determining the plurality of harmonic compensation components.

6. The method of claim 1, wherein amplitude and phase of each harmonic compensation component of the plurality of harmonic compensation components are manually tuned to reduce a corresponding harmonic component.

7. The method of claim 1, further comprising storing the plurality of harmonic compensation components in the inverter coupled to the distributed generator.

8. The method of claim 7, wherein the plurality of harmonic compensation components are stored in a look-up table.

9. The method of claim 7, wherein the compensating current is superimposed on a current waveform, and wherein the current waveform is at a fundamental frequency of an AC line coupled to an output of the inverter coupled to the distributed generator.

10. The method of claim 1, wherein the plurality of harmonic components are $23^{rd}$-$39^{th}$ order harmonics.

11. An apparatus for reducing harmonic distortion, comprising:

an inverter coupled to a distributed generator, wherein the inverter comprises:

a harmonic reduction module for storing a plurality of harmonic compensation components, wherein the plurality of harmonic compensation components are determined based on a plurality of harmonic components of an inverter output current waveform characterized by notching proximate respective zero crossings such that each notch corresponds to distortion associated with operation of an inverter, and wherein at least some harmonic components of the plurality of harmonic components result from the distortion; and a power conversion module for generating a compensating current comprising the plurality of harmonic compensation components.

12. The apparatus of claim 11, wherein the inverter output current waveform is determined by analytical modeling based on an output current from one or more inverters.

13. The apparatus of claim 11, wherein the inverter output current waveform is empirically determined by measuring an output current from one or more inverters.

14. The apparatus of claim 11, wherein an amplitude of each harmonic component of the plurality of harmonic components is analytically calculated based on the inverter output current waveform.

15. The apparatus of claim 11, wherein an amplitude of each harmonic component of the plurality of harmonic components is measured for determining the plurality of harmonic compensation components.

16. The apparatus of claim 11, wherein amplitude and phase of each harmonic compensation component of the plurality of harmonic compensation components are manually tuned to reduce a corresponding harmonic component.

17. The apparatus of claim 11, wherein the harmonic reduction module stores the plurality of harmonic compensation components.

18. The apparatus of claim 17, wherein the harmonic reduction module comprises a look-up table for storing the plurality of harmonic compensation components.

19. The apparatus of claim 18, wherein the compensating current is superimposed on a current waveform, and wherein the current waveform is at a fundamental frequency of an AC line coupled to an output of the power conversion module.

20. The apparatus of claim 11, wherein the plurality of harmonic components are $23^{rd}$-$39^{th}$ order harmonics.

* * * * *